(No Model.)
R. EICKEMEYER.
ELECTRO MAGNETIC AND MAGNETO ELECTRIC MACHINE.
No. 352,234. Patented Nov. 9, 1886.
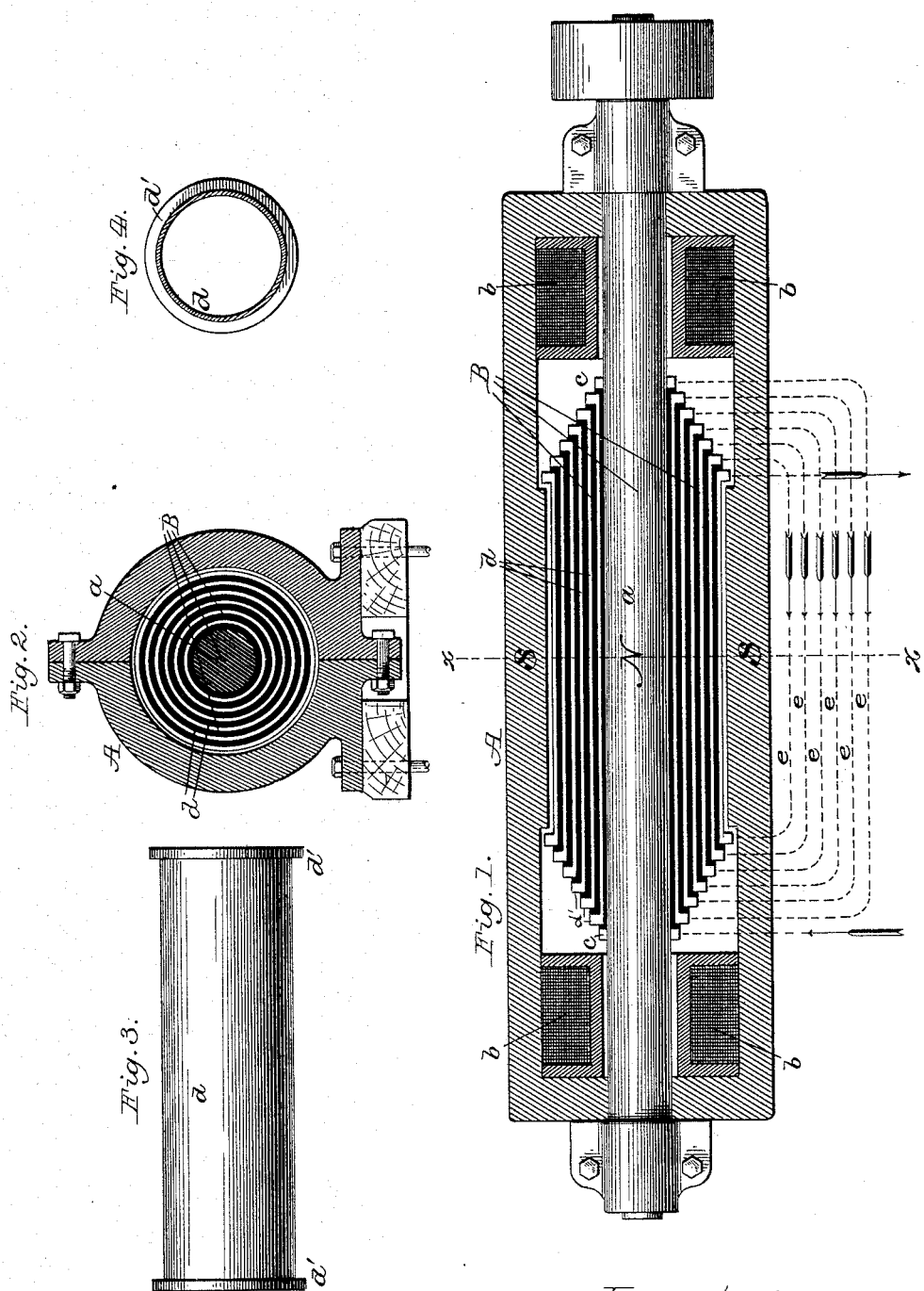
Attest:
Philip F. Larner.
Howell Bartle.
Inventor:
Rudolf Eickemeyer,
By Wm C. Floyd
Attorney.

UNITED STATES PATENT OFFICE.

RUDOLF EICKEMEYER, OF YONKERS, NEW YORK.

ELECTRO-MAGNETIC AND MAGNETO-ELECTRIC MACHINE.

SPECIFICATION forming part of Letters Patent No. 352,234, dated November 9, 1886.

Original application filed November 8, 1882, Serial No. 76,234. Divided and this application filed October 23, 1885. Serial No. 180,700. (No model.)

*To all whom it may concern:*

Be it known that I, RUDOLF EICKEMEYER, of Yonkers, in the county of Westchester and State of New York, have invented certain new and useful Improvements in Electro-Magnetic and Magneto-Electric Machines; and I do hereby declare that the following specification, taken in connection with the drawings furnished and forming a part of the same, is a clear, true, and complete description of the several features of my invention.

It is to be understood that the machine hereinafter particularly described and illustrated in the drawings includes certain features of my invention which are broadly claimed by me in my application for Letters Patent filed November 8, 1882, Serial No. 76,234, and that in my said application I have shown and described in detail the machine which constitutes the subject of this application, which is now filed as a division of said prior application.

My present improvements relate to what are known as "unipolar" machines.

The characteristic feature of a machine embodying my present improvements is an armature or electric generating element having an axis or shaft surrounded by a series of concentric tubes, insulated from each other and from said axis. I have also so organized said armature within an inclosing-magnet that the axis of said armature is polarized, and therefore said tubes are rotated within an annular field of force. I have also so organized said tubes that each serves as an independent electric conductor, and all of them, or any lesser number, may be electrically connected in linear circuit.

The several features of my invention which I propose to include in this application will be specified in the several clauses of claim hereunto annexed.

Referring to the drawings, Figure 1 is a longitudinal horizontal central section of a machine embodying my said improvements. Fig. 2 is a vertical cross-section of the same on line $x$. Figs. 3 and 4 illustrate in side and sectional views one of the armature-tubes detached.

The outer or main magnet, A, is constructed in two parts, bolted together, and to a suitable platform. It is cylindrical in form, and closed at its ends, except centrally, where it is axially bored for the reception of the iron axis $a$ of the armature B. At each end of the outer magnet, and within it, there is a helix, $b$, so wound as to polarize the metal of the outer magnet at a point midway of its length, and also to polarize the axis $a$ at a corresponding point. As here shown, the outer magnet is polarized S, and the inner magnet or axis, $a$, is polarized N, as clearly indicated, thus affording an annular field of force. The axis $a$, as here shown, also serves as an electric conductor, and it is provided with two conducting-rings, $c$, which enable electric connection to be made therewith by means of brushes or other well-known means.

The several tubes $d$, of various lengths and diameters, are concentrically mounted upon the axis, and there are electrically insulated from each other and from said axis, and at each end they are provided with conducting-rings $d'$, all of which are accessible—by way of apertures (not shown) in the outer magnet—to outside conductors, (indicated in dotted lines at $e$.) As here shown, one end of the outer tube and one of the conducting-rings $c$ on the axis $a$ constitute the terminals of the machine. It will be seen that one end of the inner tubular conductor is connected with the opposite end of the next larger tube, and this in like manner is coupled to the next larger, and so on, the whole being connected in linear series, the currents in all the tubes having a direction from the left hand toward the right hand, and the currents in all of the outer conductors having an opposite direction. The armature is mounted in suitable bearings and provided with a belt-pulley, whereby it is rotated when employed as a generator, or power communicated therefrom when employed as a motor.

Having thus described my invention, I herein claim as new and desire to secure under this application for Letters Patent—

1. In an electro-magnetic or magneto-electric machine, a rotative armature embodying a series of concentric tubular conductors, substantially as described.

2. In an electro-magnetic or magneto-electric machine, an armature embodying one or more concentric tubular conductors and a polarized axis, substantially as described.

3. In an electro-magnetic or magneto-electric machine, the combination of an exterior tubular magnet, an armature embodying one or more tubular conductors and a polarized axis, and helices which centrally develop in said outer magnet and in said axis opposite poles, substantially as described.

RUDOLF EICKEMEYER.

Witnesses:
HENRY OSTERHELD,
HYATT L. GARRISON.